UNITED STATES PATENT OFFICE.

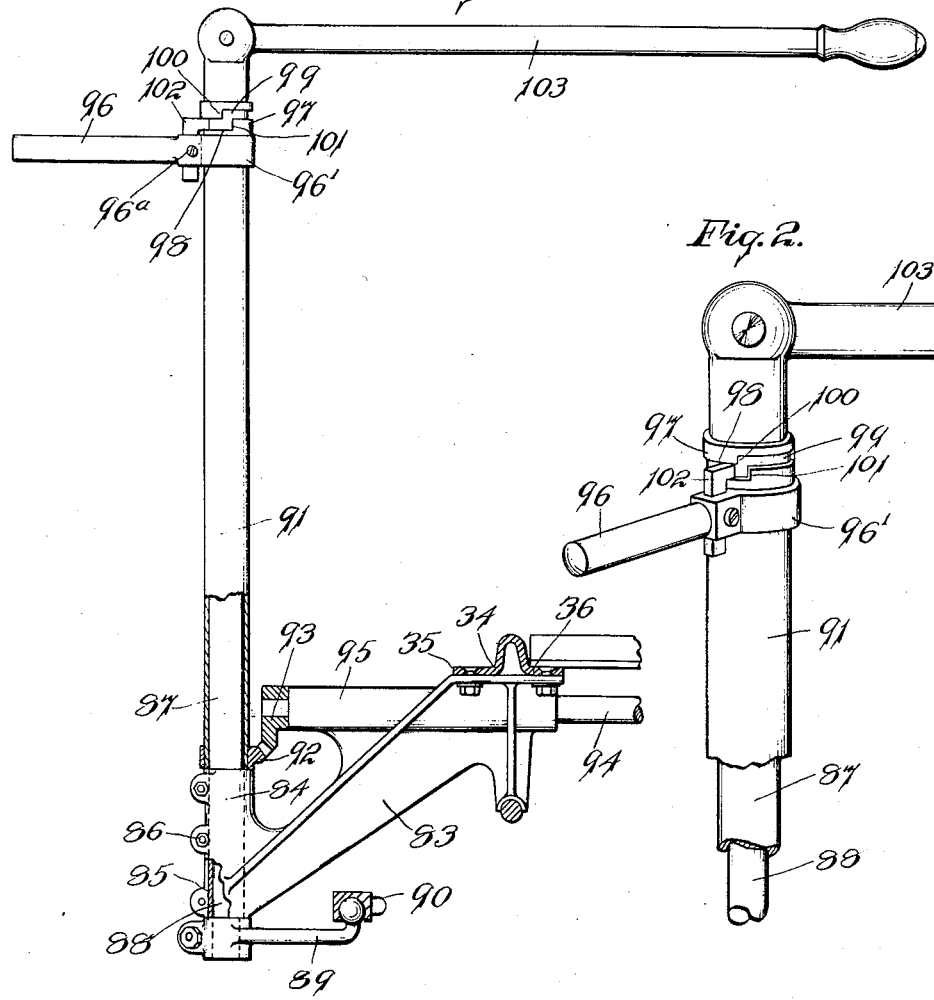

HIRAM P. MAXIM, OF HARTFORD, CONNECTICUT, ASSIGNOR TO THE WAVERLEY COMPANY, OF INDIANAPOLIS, INDIANA, A CORPORATION OF INDIANA.

CONTROL-LEVER LOCK FOR MOTOR-VEHICLES.

1,057,865.      Specification of Letters Patent.      Patented Apr. 1, 1913.

Original application filed February 27, 1908, Serial No. 418,056. Divided and this application filed March 15, 1912. Serial No. 683,999.

*To all whom it may concern:*

Be it known that I, HIRAM P. MAXIM, a citizen of the United States, and a resident of Hartford, in the county of Hartford and State of Connecticut, have invented an Improvement in Control-Lever Locks for Motor-Vehicles, of which the following is a specification.

My invention relates more especially to that class of motor vehicles designed for use on highways, and an object of my invention, among others, is to provide a controlling mechanism for such motor vehicles in which mechanism the liability to accidental operation shall be removed and a further object is to provide a combined steering and controlling mechanism that shall be extremely simple and efficient.

One form of device embodying my invention and in the construction and use of which the objects above mentioned, as well as others, may be attained is illustrated in the accompanying drawings, in which—

Figure 1 is a view in elevation of the steering and controlling mechanisms, with parts cut away to show construction. Fig. 2 is a detail perspective view, scale enlarged, showing the construction and operation of the controlling mechanism.

The mechanism shown and described herein is particularly applicable to the motor vehicle forming the subject matter of my co-pending application, filed February 27th, 1908, of Serial Number 418,056, the subject matter of this application being a division of said co-pending application.

In the accompanying drawing the numeral 83 denotes a steering post bracket secured to the under surface of a side bar 34 and preferably to each of the outer and inner flanges 35—36, as shown in Fig. 1 of the drawings. This bracket extends in a diagonal direction downward and laterally of the vehicle frame, having a tubular steering post neck 84 at its outer end, slotted as at 85, screws 86 serving to clamp the neck about a supporting sleeve 87. This supporting sleeve is securely held, as described, projecting upward from the neck as shown in Fig. 1. A steering post 88 projects through this sleeve, this post having secured at its lower end and under the bracket 83 a steering arm 89 suitably connected by a rod 90 with the steering mechanism appurtenant to the front wheels of the vehicle. A controller sleeve 91 is mounted upon the supporting sleeve 87, said controller sleeve bearing a toothed segment 92 meshing with a toothed segment 93 upon a controller shaft 94 extending to the controller (not shown). The controller for the sake of brevity, has not been illustrated herein, but its construction and operation will be readily understood by those skilled in the art, and the shaft 94 may be suitably connected with the controller shaft or such shaft may be extended to the position shown. It has a suitable bearing in a controller shaft neck 95 extending from the bracket 83.

My invention contemplates the provision of means to prevent accidental or unintentional operation of the controller handle, in the mechanism herein shown it being impossible to move the controller handle from its forward driving position or "off" position to the reverse position and vice versa.

In the form of mechanism shown herein a controller handle 96 extends from a band 96' mounted to rotate with the controller sleeve 91, being suitably held against lengthwise movement thereon. This band is located adjacent, in the present instance underneath, to a controller ring 97 having slots 98—99 adapted to receive a pawl 102 movably mounted on the band 96'. As shown herein, the slots 98—99 are out of line with each other, but are connected by an opening including shoulders 100 and 101. From the drawing it will be observed that in a movement of the controller handle backward along the slot 98 or toward the shoulder 101, the pawl 102 will encounter such shoulder. At this point the controller handle is in its off position. In order to move the handle to reverse the direction of movement of the vehicle the pawl 102 must be moved upward through the connecting opening between the slots 98—99, this requiring a special operation to move the pawl. Should the pawl be located in the slot 99, in moving the lever handle toward the forward driving position, the pawl will encounter the shoulder 100 which is the off position, and the pawl 102 must be moved downward before the handle can be moved to cause the vehicle to move forward. A binding screw 96ᵃ projects into the band 96', and its inner end binds against the pawl 102 to a degree sufficient to hold the pawl in any position, but at the same time allow a movement for the purpose intended. Any suitable means of engagement between the screw and pawl may be employed. The controller handle, for the purpose of clearness in illustration, is located in different positions in Figs. 1 and 2, and a steering handle 103 is secured to the upper part of the steering post 88.

While I have shown and described herein a satisfactory form of mechanism embodying the invention it is to be understood that the invention may be embodied in constructions different from that herein shown and described.

I claim—

1. A controller device movably supported, controller operating mechanism connected therewith, a handle connected with said device, manually operated means carried by said device for controlling its movement and inaccessible to a hand upon the handle, and means co-acting with the manually operated means to limit movement of said device until after actuation of the manually operated means.

2. A controller device movably mounted, controller operating mechanism, connections between said device and controller operating mechanism, a handle secured to the device, a manually operated pawl carried by said device inaccessible to a hand upon the handle, and means co-acting with said pawl to limit the movement of said device until after manual operation of the pawl.

3. A controller device movably mounted, controller operating mechanism, connections between said device and controller operating mechanism, a handle supported by the device, a manually operated pawl borne by said device inaccessible to a hand upon the handle, a controller ring having slots engaged by said pawl, and shoulders in said slots to limit the movement of the handle in one direction until after operation of said pawl.

4. A controller sleeve rotatably mounted but fixed against longitudinal movement, controller operating mechanism connected with said sleeve, a handle secured to said sleeve, a pawl carried by the sleeve, but removable independently thereof, a controller ring having slots to be engaged by said pawl, and an opening between said slots forming shoulders to limit the movement of said pawl.

5. A support for a controller device, a controller device rotatably mounted on said support and held against longitudinal movement, controller operating mechanism connected with said device, a handle secured to said device, a manually operated pawl carried by the device inaccessible to a hand upon the handle, and means co-acting with the pawl to prevent rotative movement of the device until after operation of said pawl.

6. A support for a controller device, a controller device rotatably mounted on said support and held against longitudinal movement, controller operating mechanism connected with said device, a controller ring having slots, a pawl carried by the device to engage said slots, a handle carried by the device, and connections between said slots forming shoulders to limit the rotative movement of said device.

7. A controller device support, a controller device rotatably mounted on said support and held against longitudinal movement, controller operating mechanism connected with said device, a handle secured to the device, a pawl mounted in the handle, and a controller ring having slots located in different lines to receive said pawl and with an opening between said slots forming shoulders to limit the rotative movement of the controller device.

8. A support, a controller sleeve rotatably mounted on the support and held against longitudinal movement, controller operating mechanism connected with said sleeve, a handle secured to the sleeve, a pawl mounted in the handle but movable independently thereof, a controller ring having an angular shaped slot with shoulders therein within which said pawl projects, and means to move the pawl into engagement with said shoulders.

9. A support, a controller sleeve rotatably mounted on said support and held against longitudinal movement, controller operating mechanism connected with said sleeve, a handle secured to said sleeve, a controller ring having an angular shaped slot provided with shoulders, a pawl mounted on the handle and movable independently thereof to engage said shoulders, and means for exerting a frictional hold upon said pawl.

HIRAM P. MAXIM.

Witnesses:
 ARTHUR B. JENKINS,
 EVA L. STOUGHTON.